United States Patent [19]

Shimoda

[11] Patent Number: 5,541,689
[45] Date of Patent: Jul. 30, 1996

[54] PLATE FRAME FOR USE IN LARGE-FORMAT CAMERA ENABLING MOUNTING OF A SMALLER SIZE FILM HOLDER

[76] Inventor: Harutada Shimoda, 20-11, Nakajujo-3-chome, Kita-ku, Tokyo, Japan

[21] Appl. No.: 292,754

[22] Filed: Aug. 18, 1994

Related U.S. Application Data

[63] Continuation-in-part of Ser. No. 79,265, Jun. 21, 1993, abandoned.

[30] Foreign Application Priority Data

Jun. 25, 1992 [JP] Japan .................................. 4-206931

[51] Int. Cl.$^6$ .................................................. G03B 17/26
[52] U.S. Cl. ........................ 354/159; 354/276; 354/295
[58] Field of Search .................................. 354/159, 275, 354/276, 295

[56] References Cited

U.S. PATENT DOCUMENTS 1,556,868  10/1925  Murray ...................................... 354/159
1,913,912   6/1933  Baldeweg ................................. 354/159
2,210,988   9/1940  Shelton .................................... 354/159
3,678,834   7/1972  Melillo ..................................... 354/159
4,384,774   5/1983  Tuck ........................................ 354/159
4,804,989   2/1989  Kumanomido ....................... 354/276 X Primary Examiner—Michael L. Gellner
Assistant Examiner—J. K. Han
Attorney, Agent, or Firm—Oliff & Berridge

[57] ABSTRACT

A film-size-interchangeable sheet film holder for a camera using a large-sized film holder for accommodating sheet films has a structure which allows use of a small-sized film holder for smaller films without requiring replacement of a rear camera frame (containing a focusing glass, etc.) for attaching the holder, as in the prior art. The film-size-interchangeable sheet film holder includes a larger film holder in the form of a relatively wide plate having a groove in which a smaller film holder can be accommodated, the smaller film holder being secured onto the larger film holder by plate springs.

9 Claims, 6 Drawing Sheets

PLATE FRAME FOR USE IN LARGE-FORMAT CAMERA ENABLING MOUNTING OF A SMALLER SIZE FILM HOLDER

This is a Continuation-in-Part of Application No. 08/079,265 filed Jun. 21, 1993, now abandoned.

BACKGROUND OF THE INVENTION

1. Field of the Invention

This invention relates to a film-size-interchangeable sheet film holder for use in large-format cameras. In a large-format camera, the lens is attached to a camera section called a front frame, and the film is loaded in a camera section called a rear frame, which accommodates a focusing glass, etc., the front and rear frames being joined together through bellows. The sheet film holder of the present invention consists of a large film holder in the form of a relatively wide plate, to which a smaller film holder can be attached. As the rear frame does not have to be replaced, use of this sheet film holder enables films having different sizes to be easily used in a large-format camera.

2. Description of the Related Art

A sheet film holder for large-format cameras has a standardized dimension regarding the distance between its surface facing the associated camera and the surface of the film in the holder, the dimension being determined in accordance with the film size. As a result, the position and size of the focusing glass of a large-format camera vary depending on a film size. Thus, each time a film having a size different from that of a previously used film is to be useful in the same, previously used large-format camera, it has been necessary to detach the entire rear frame, which accommodates the focusing glass and the film holder, and to attach a new rear frame containing a new focusing glass and film holder set which is in conformity with the new film size. Thus, because of the above, it has been necessary for a photographer to carry an additional rear frame for attaching a different focusing glass and film holder set.

For example, when two films having different sizes are to be used in a large-format camera, it has been necessary to prepare a film holder, focusing glass and rear frame for films of the smaller size, as well as a film holder, focusing glass and rear frame for films of the larger size. A single film holder, focusing glass and rear frame set constitutes a considerably heavy burden. Thus, it would be very burdensome to have to carry two sets of such equipment.

SUMMARY OF THE INVENTION

In accordance with the present invention, there is provided a film holder comprising a large film holder in the form of a plate having a relatively large width, a smaller film holder being attached to an inner section of the large film holder in such a way that the film plane of the smaller film holder coincides with the film plane of the larger film holder. Due to the coincidence of the respective film planes of the large and small film holders, the position and size of the focusing glass are the same for the large and small film holders, so that there is no need to replace the rear frame accommodating the focusing glass and the holder as in the prior-art film holders, thereby making it possible to use films of the smaller size in the same way as the films of the large size are used.

Further, if the size of the sheet film holder is such that the film plane of the smaller film holder does not coincide with the film plane of the large film holder, the present invention enables the positional relationship between the film plane of the smaller film holder and the focusing glass to be adjusted to the positional relationship between the film plane of the large film holder and the focusing glass by means of a spacer inserted between the film holder and the focusing glass. Therefore, even in such a case, the same effect as described above can be obtained.

The present invention improves a relatively large film holder for use in a large-format camera so as to obtain a film-size-interchangeable sheet film holder which allows loading of both small and large films. In other words, although the film holder of this invention is large-film holder in appearance, it is also capable of loading smaller films. Thus, use of the film-size-interchangeable sheet film holder of this invention makes it possible to use the same focusing glass and rear frame for both large and small films.

Accordingly, if two films having different sizes are to be used in photographing, it is only necessary to prepare a film-size-interchangeable sheet film holder according to this invention and a film holder for the large films, apart from the focusing glass and rear frame for the large films, thus attaining a substantial reduction in the amount of photographing equipment required.

DETAILED DESCRIPTION OF THE PREFERRED EMBODIMENTS

Figure 1:
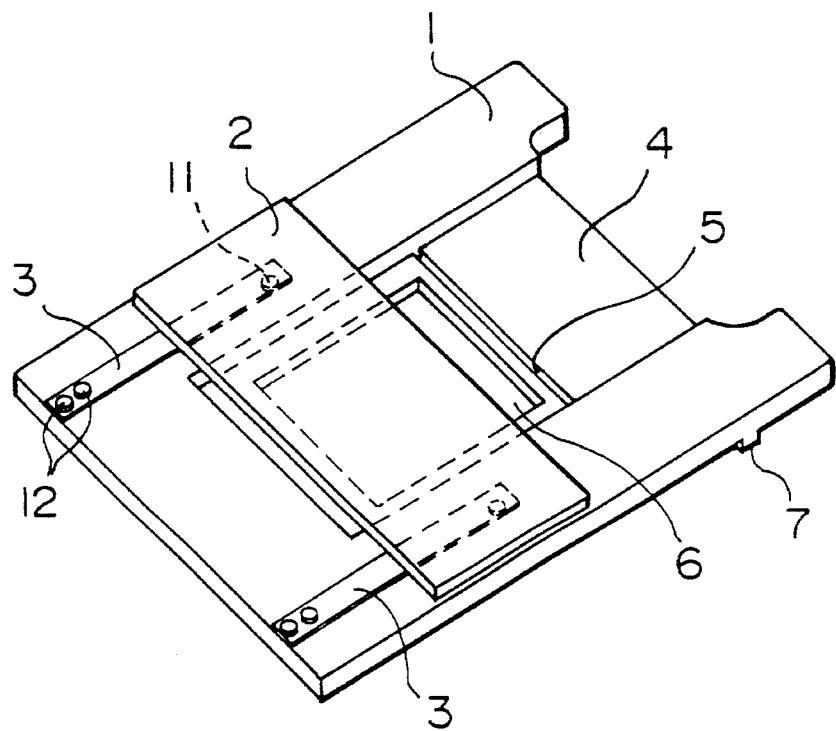
FIG. 1 is a perspective view of a film-size-interchangeable sheet film holder according to the present invention.
Figure 2:
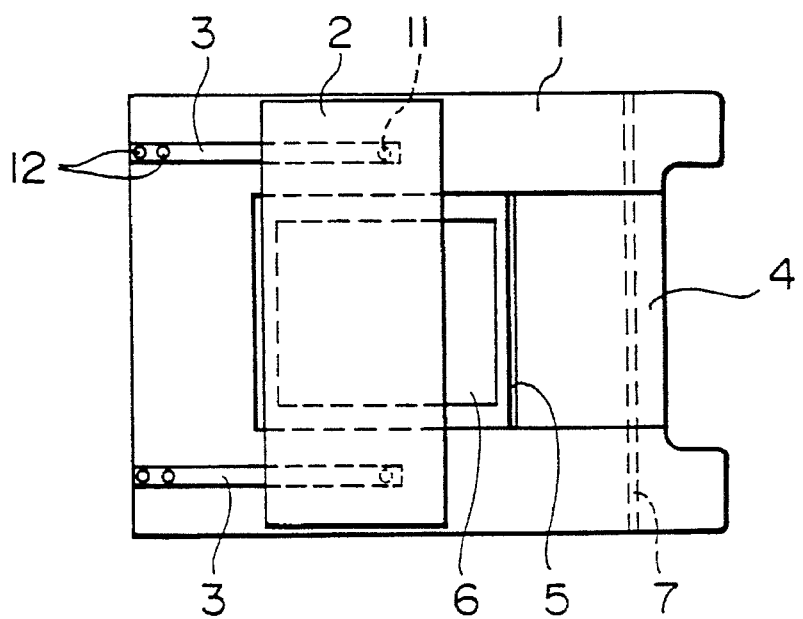
FIG. 2 is a plan view of the film holder.
Figure 3:
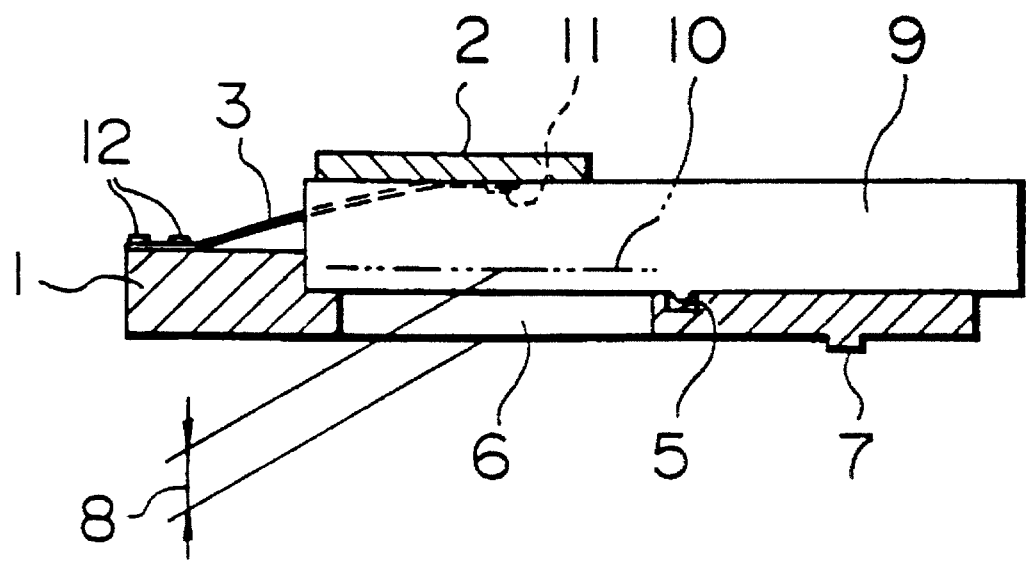
FIG. 3 is a sectional view of the film-size-interchangeable film holder with a smaller-sized film holder attached thereto.

Referring to FIGS. 1 and 2, a relatively wide groove 4 for accommodating a smaller film holder 9 is provided in a film-size-interchangeable holder 1 according to this invention. The holder 1 is in the form of a plate having a width corresponding to films of a relatively large size. Further, a narrow groove 5 for accommodating a shielding protrusion of the smaller film holder 9 is provided in the holder 1. Plate springs 3 are provided on the holder 1. One end of each plate spring 3 is attached to a presser plate 2 by means of a rivet 11, and the other end of each plate spring 3 is attached to the holder 1 by means of rivets 12. The presser plate 2 holds the smaller holder 9 and secures it onto the holder 1 (FIG. 3). When thus assembled, the holder 1 exhibits a standardized dimension 8 regarding the distance between its surface facing the associated camera and the surface 10 of a film loaded in the smaller film holder 9. An opening 6 serves as a light window for the smaller films. The holder 1 further includes a protrusion 7 which serves as a shielding when the holder 1 is attached to the associated large-format camera. The size of this protrusion 7 is standardized.

Due to the above-described structure of the sheet film holder of this invention, it is possible to use films of different sizes solely by changing the holder, and there is no need to carry an additional rear frame for accommodating a focusing glass and holder for films of a different size. It should be noted that as there are no dimensional standards regarding this rear frame, it can only be attached to certain cameras. In other words, its dimensions vary depending on the manufacturer, which means it is not compatible with different cameras. In contrast, standard sizes for the film holders have been established, which means the film-size-interchangeable sheet film holder of this invention is compatible with different cameras. Thus, as compared with the conventional film holders requiring rear-frame replacement, the film holder of the present invention is simpler in structure, lighter in weight, more economical and easier to manipulate.

Figure 4:
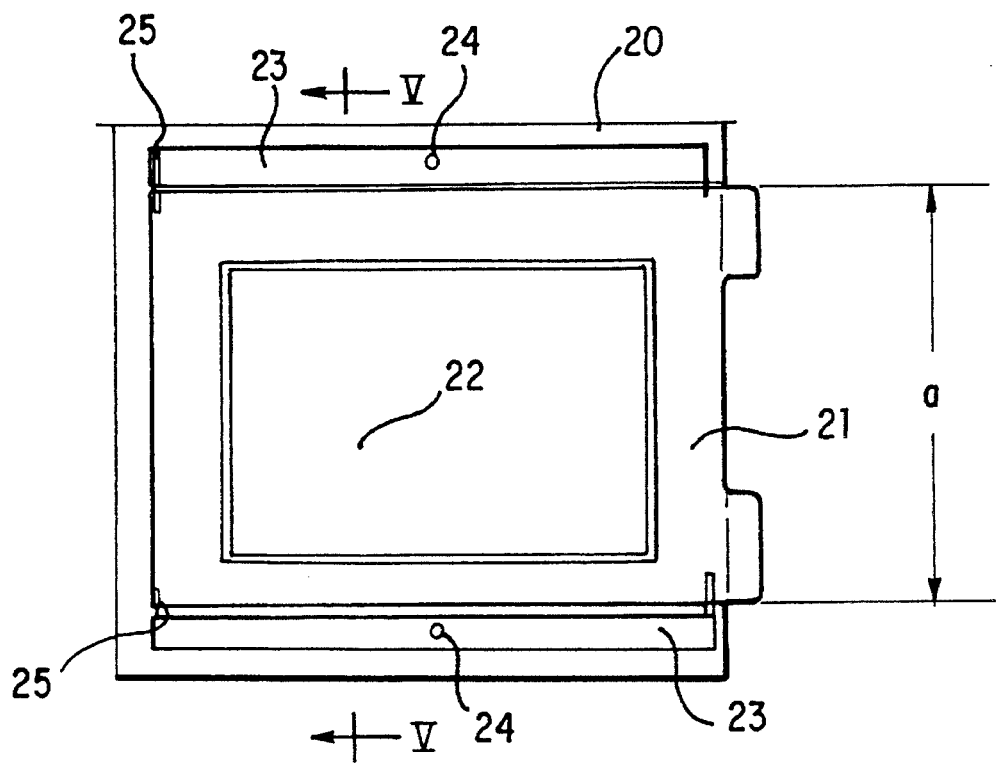
FIG. 4 is a view of a rear frame of the camera.
Figure 5:
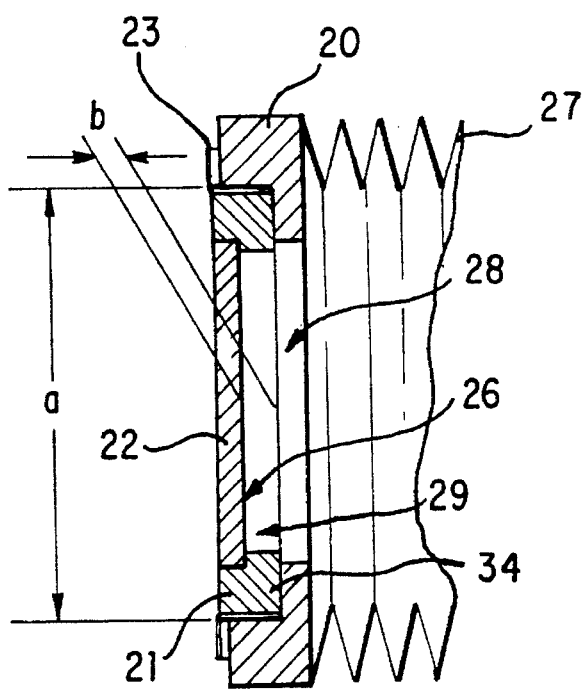
FIG. 5 is a sectional view of the rear frame taken along the line A—A of FIG. 4.

A description will now be given of the construction or structure of the portion of a sheet-film camera for receiving a film holder. FIG. 4 is a view of a rear frame of a camera, while FIG. 5 is a sectional view of the rear frame taken along the line A—A of FIG. 4.

A rear frame 20 of the camera body has a recess or groove of a width "a." A glass supporting plate 21 holding a focusing glass 22 is pressed by a pair of leaf springs 23 and is connected to the rear frame 20 by means of bearings 25. The leaf springs 23 are fixed to the camera body 20 by means of screws 24. The rear frame 20 of the camera body is connected to bellows 27 which is connected at its other end to a front frame having a lens. The focusing surface 26 of the focusing glass 22 is spaced by a distance "b" determined in accordance with U.S. standard from the bottom surface 30 of the width "a" formed in the camera rear frame 20. In use of the camera, the rear frame and/or the front frame carrying the lens is moved along the optical axis so that the subject image is focused on the focusing surface 26. According to the U.S. standard, different distance values "b" apply to different sizes of the film holder.

Figure 6:
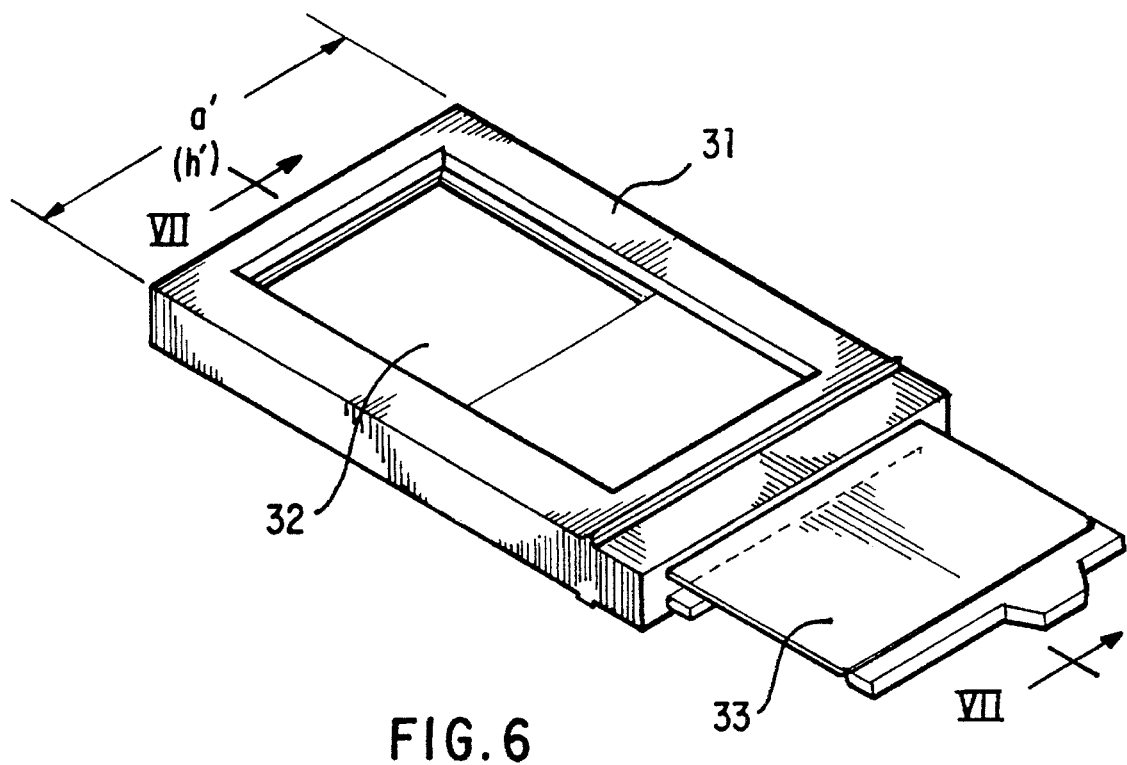
FIG. 6 is a perspective view of a film holder adapted to be received in the groove of the rear frame.
Figure 7:
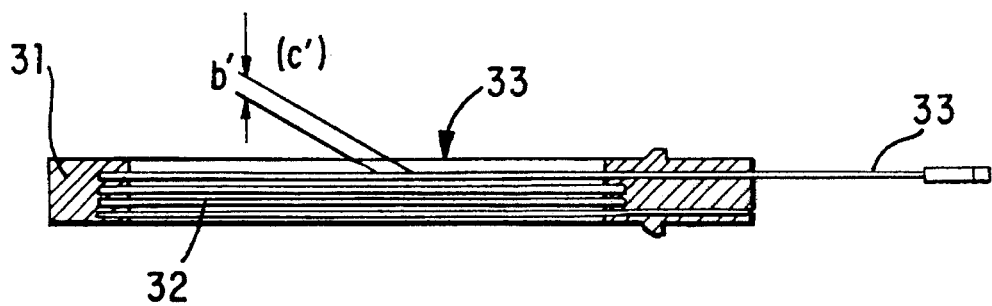
FIG. 7 is a sectional view of the film holder taken along a line B—B of FIG. 6.

Referring to FIG. 6, a film holder 31 adapted to be received in the groove of the width "a" formed in the camera rear frame 20 has a width "a" which also is determined in accordance with the U.S. standard and, as shown in FIG. 7, a distance "b'" ruled in accordance with the U.S. standard is preserved between the surface 33 of the film holder 31 and the surface of a film 32.

Figure 8:
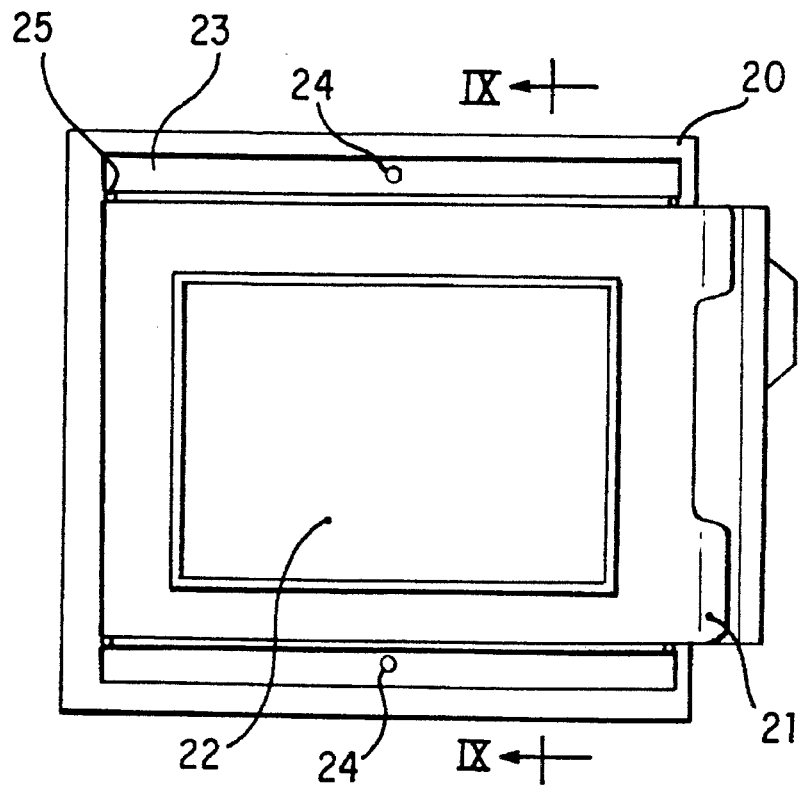
FIG. 8 is a top view of a second film holder mounted in the camera.
Figure 9:
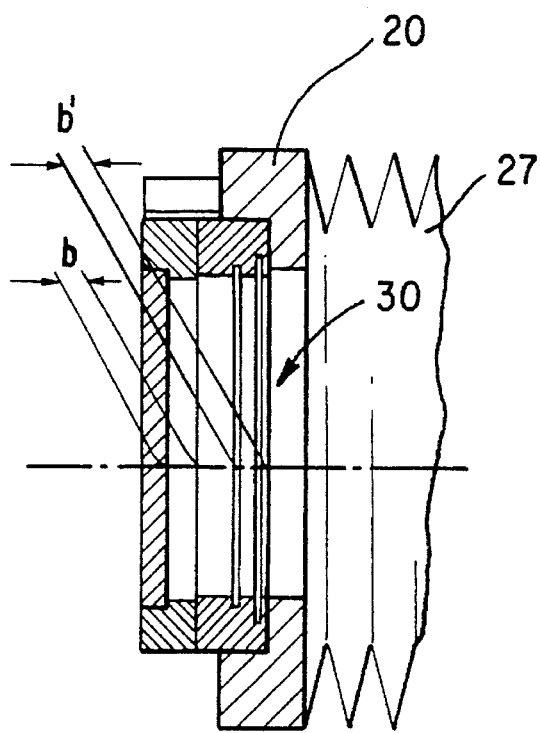
FIG. 9 is a sectional view of the second film holder taken along a line C—C of FIG. 8.

FIG. 8 illustrates the film holder 33 mounted in the camera body as viewed in a direction perpendicular to the plane of the film holder, while FIG. 9 is a sectional view of the same.

The above-mentioned distance "b'" coincides with the aforementioned spacing "b" between the focusing glass and the camera body. The film holder 31 is clamped between the rear frame 20 of the camera body and the glass supporting plate 21 and is pressed by the leaf springs 23, whereby the film surface can be exposed in an in-focus state. The camera is thus used with a sheet film.

It will be understood from the foregoing description that the width "a" in the camera body (rear frame 20) for receiving the film holder is specified by the standard, as well as the distance "b" between the groove surface and the film surface. Consequently, this camera is usable only in combination with a film holder having the fixed width "a'." That is to say, any film holder having a width smaller than "a'" cannot be used in this camera.

To obviate this problem, the invention of this application proposes to use a size-interchangeable holder 1 of the width "a'" shown in FIG. 1. The holder 1 has a groove 4 of a width "h" for receiving a smaller-size film holder, i.e., the film holder having a width "h'." Thus, the film holder is mounted in the camera body 20 through the intermediary of the size-interchanging holder 1. The arrangement is such that the distance "c" between the surface of the film holder 9 of the smaller size and the film surface is smaller than the aforementioned distance "b'" (b'>c'). The dimension that is the sum of the thickness of the groove bottom portion of the holder 1 and the above-mentioned distance c' is denoted by 8 in FIG. 3; namely, distance "b" is indicated by 8.

Figure 11:
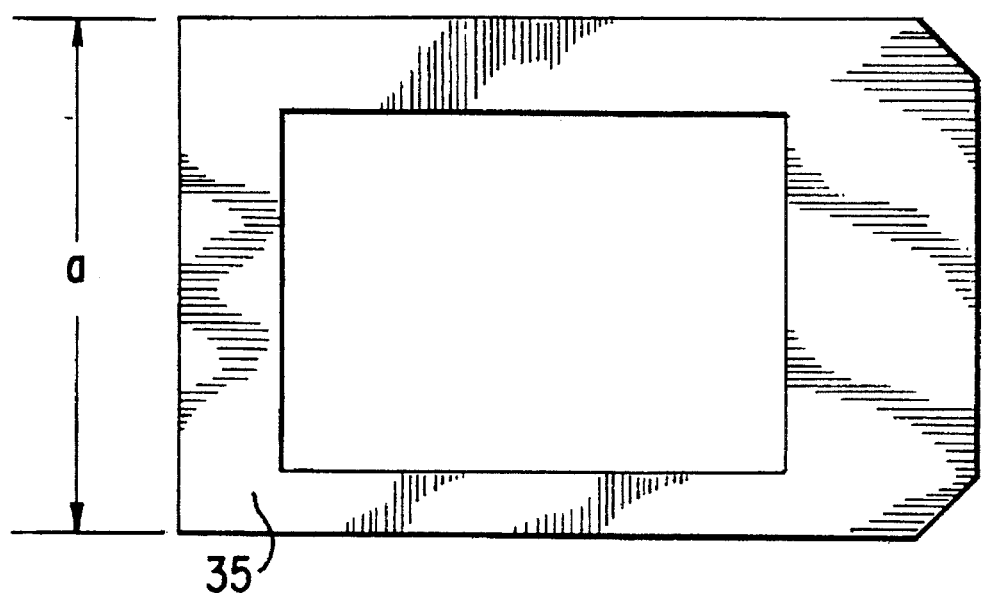
FIG. 11 is a sectional view of the camera of FIG. 5 with the spacer of FIG. 10.
Figure 10:
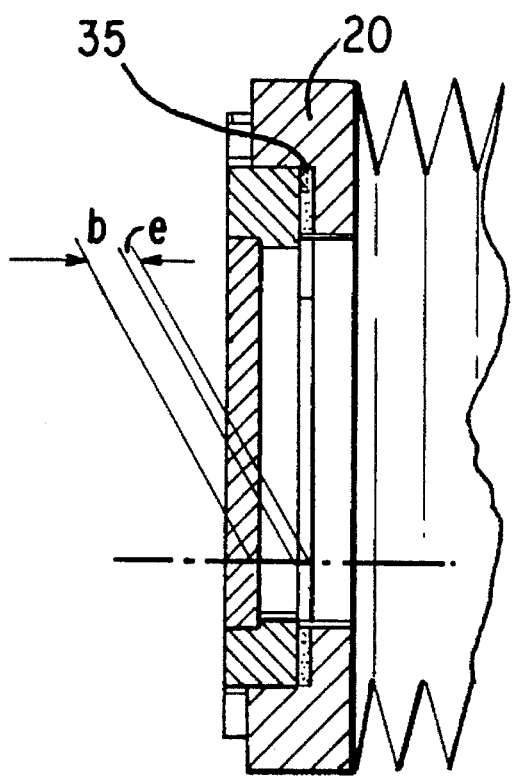
FIG. 10 is a top view of a spacer.

It is therefore possible to selectively use both the standard film holder having the width "a'" and the smaller film holder having the width "h'" in one large-format camera having the groove width "a." Thus, the invention of this application offers an advantage in that two types of films of different sizes can selectively be used in the camera, without requiring any modification of the camera construction, by virtue of the use of the size-interchangeable holder 1. In the case where the distance "b" between the film surface and the camera groove surface is greater than 8 as shown in FIG. 3 (b>8), the focusing is conducted by placing a spacer 35 a thickness "e"(see FIGS. 10–11) between the bottom of the groove of the width "a" in the camera body and the glass supporting plate 21. The spacer is removed when the size-interchangeable holder used in the invention is inserted. Thus, the condition of 8=b+e must be met. Namely, the distance between the groove bottom surface of the camera body and the surface of the glass, as well as the distance between the film holder surface and the film surface must be strictly maintained constant because the camera is operated such that focusing is attained on the surface of the focusing glass and then exposure is conducted by inserting the film holder holding the sheet film.

What is claimed is:

1. A plate frame for use in a large-format camera of the type including a front frame mounting a lens, a rear frame mounting a focusing glass and including a first groove for mounting a single first film holder and a window for passing light to the first film holder, and bellows interconnecting the front frame and the rear frame, said plate frame comprising:

a plate body having a predetermined width enabling said plate body to fit in said first groove provided in said rear frame;

means for detachably mounting a second film holder of a width smaller than said predetermined width of said plate body onto said plate body;

a window located in said frame plate body for passing light to said second film holder; and wherein said means for detachably mounting includes a transverse groove within said plate body adjacent said window, said transverse groove engaging a protrusion on the second film holder to prevent sliding of the second film holder relative to the plate body.

2. The plate frame of claim 1, wherein said means for mounting includes a presser plate mounted to said plate body by at least one spring.

3. The plate frame of claim 1, wherein said frame plate body includes a second groove sized to receive said second film holder and said means for mounting holds said second film holder against said second groove.

4. The plate frame according to claim 3, wherein said transverse groove is located within said second groove.

5. A plate frame for use in a large-format camera of the type including a front frame mounting a lens, a rear frame mounting a focusing glass and including a first groove for mounting a single first film holder sized to accept a first size film thereon, a first window located on the rear frame for passing light to the first film holder, and bellows interconnecting the front frame and the rear frame, said plate frame comprising:

- a plate body having a width corresponding to the first film holder enabling said plate body to fit in said first groove provided in said rear frame;
- a second groove formed on said plate body sized to fit a second, smaller film holder, said second film holder being sized to accept a second, smaller size film thereon;
- a transverse groove within the second groove for engaging a protrusion on the second film holder, wherein the engagement of said transverse groove with the protrusion prevents the second film holder from sliding relative to the plate body;
- a presser plate attached to said plate body and capable of biasing said second film holder against said second groove; and
- a second window located in said plate body communicating with said first window of said rear frame and allowing light from said camera to pass to said second film holder.

6. The plate frame of claim 5, wherein said plate body has a bottom surface and a top surface, said second groove being formed in said top surface, said second groove defining a film surface for locating said second film, a distance between said film surface and said bottom surface being of a dimension allowing a film plane of said second film holder to coincide with a film plane of said first film holder, thereby allowing use of a same focusing glass.

7. The plate frame of claim 5, further comprising a spacer plate between the focusing glass of said rear and said plate body to adjust a film plane of said second film holder.

8. The plate frame of claim 5, wherein said pressure plate is attached to said plate body by at least one plate spring.

9. The plate of claim 5, wherein said plate body includes a shielding protrusion of a bottom surface of said plate body.

* * * * *